(12) United States Patent
McGrew

(10) Patent No.: US 7,021,659 B2
(45) Date of Patent: Apr. 4, 2006

(54) SEMI-TRAILER LANDING GEAR RATCHETING APPARATUS

(76) Inventor: David L. McGrew, 5 Great Valley Pkwy., Malvern, PA (US) 19355

( * ) Notice: Subject to any disclaimer, the term of this patent is extended or adjusted under 35 U.S.C. 154(b) by 135 days.

(21) Appl. No.: 10/787,916

(22) Filed: Feb. 27, 2004

(65) Prior Publication Data

US 2004/0188981 A1    Sep. 30, 2004

Related U.S. Application Data

(63) Continuation-in-part of application No. 10/726,497, filed on Dec. 4, 2003, which is a continuation-in-part of application No. 10/309,215, filed on Dec. 4, 2002, now abandoned.

(51) Int. Cl.
  *B60D 1/00* (2006.01)

(52) U.S. Cl. ................. 280/763.1; 280/766.1

(58) Field of Classification Search ............. 280/763.1, 280/764.1, 765.1, 418, 419, 421, 422, 424–427
See application file for complete search history.

(56) References Cited

U.S. PATENT DOCUMENTS

| 2,499,625 | A | * | 3/1950 | Black | 254/419 |
| 3,596,877 | A | * | 8/1971 | Eastman | 254/425 |
| 3,861,648 | A | * | 1/1975 | Glassmeyer | 254/419 |
| 4,187,733 | A | * | 2/1980 | Walther et al. | 74/342 |
| 4,402,526 | A | | 9/1983 | Huetsch | |
| 4,466,637 | A | | 8/1984 | Nelson | |
| 4,928,488 | A | | 5/1990 | Hunger | |
| 5,451,076 | A | | 9/1995 | Burkhead | |
| 5,451,080 | A | | 9/1995 | Kneile | |
| 5,911,437 | A | | 6/1999 | Lawrence | |
| 6,224,103 | B1 | | 5/2001 | Hatcher | |
| 6,260,882 | B1 | | 7/2001 | Kingsbury | |
| 6,499,258 | B1 | * | 12/2002 | Borglum | 52/9 |

* cited by examiner

*Primary Examiner*—Christopher P. Ellis
*Assistant Examiner*—Bridget Avery
(74) *Attorney, Agent, or Firm*—Richard C. Litman

(57) ABSTRACT

A manual cranking apparatus for the landing gear of a semi-trailer. The cranking apparatus includes a rotatable mechanism that is permanently connected to the cross-shaft of the landing gear. The rotatable mechanism is adapted to be folded such that, in storage position, the mechanism is positioned beneath the trailer.

4 Claims, 5 Drawing Sheets

SEMI-TRAILER LANDING GEAR RATCHETING APPARATUS

CROSS-REFERENCE TO RELATED APPLICATIONS

This application is a continuation-in-part of U.S. patent application Ser. No. 10/726,497 filed Dec. 4, 2003, which is a continuation-in-part of U.S. patent application Ser. No. 10/309,215 filed Dec. 4, 2002, now abandoned.

BACKGROUND OF THE INVENTION

1. Field of the Invention

The present invention generally relates to support devices. More specifically, the present invention is drawn to a mechanical device for raising and lowering the landing gear on a semi-trailer.

2. Description of the Related Art

Usually, a semi-trailer is loaded and unloaded in free-standing position (unattached to the cab). Landing gear must be lowered to support the semi-trailer in this free-standing position and raised when the trailer is reattached to the cab. In most instances the landing gear is raised and lowered by manipulating a hand crank. Hand cranking requires that the operator bend over to rotate the crank. This scenario increases the potential for back strain and requires an inordinate amount of repetitive muscular exertion. Bending or stooping to manually turn the landing gear crank is the second highest cause of injury, lost work time and worker's compensation expense for truck drivers.

Ergonomics is the science of fitting the physical demands of the job to the worker to reduce or eliminate repetitive motion injuries that can lead to such disorders as tendonitis, repetitive stress syndrome and back problems. According to the National Academy Of Science, there are more than one million such injuries annually. A manual cranking apparatus, which apparatus would reduce the potential for muscular-skeletal injury and provide for more efficient torquing would certainly be a welcome addition to the art.

There is a plethora of devices in the related art for raising and lowering landing gear sans hand cranks. For example, U.S. Pat. No. 4,466,637 (Nelson), U.S. Pat. No. 6,224,103 B1 (Hatcher) and U.S. Pat. No. 6,260,882 (Kingsbury) employ electric motors to raise and lower the landing gear.

U.S. Pat. No. 4,402,526 (Huetsch), U.S. Pat. No. 5,451,076 (Burkhead) and U.S. Pat. No. 5,911,437 (Lawrence) utilize pneumatic actuators, while U.S. Pat. No. 4,928,488 (Hunger) provides a hydraulic actuator to raise and lower the landing gear.

All of the systems disclosed in the above-cited references require a substantial amount of refitting to existing trailers, which refitting would entail a large expense. Furthermore, all the systems are relatively complicated and would require relatively extensive and costly maintenance.

None of the above inventions and patents, taken either singularly or in combination, is seen to disclose a folding, ergonomic cranking apparatus for raising and lowering landing gear as will subsequently be described and claimed in the instant invention.

SUMMARY OF THE INVENTION

The present invention is a manual cranking apparatus for raising and lowering the landing gear of a semi-trailer. In a first embodiment, the apparatus includes an arm disposed in a channel, which channel is attached to a ratchet mechanism. A hub extends from the ratchet mechanism and is pivotally coupled to the cross-shaft of the trailer's landing gear via a flanged coupling member. A handle is secured to the arm. The arm is telescopically received in the channel and can be adjusted therein. The ratcheting mechanism economizes the effort needed to raise and lower the gear.

A second embodiment also utilizes a ratchet mechanism for the gear. However, the second embodiment employs a more simplistic connecting member between the ratchet mechanism and the cross-shaft. The length of the connecting member can be varied so that the embodiment can be easily retrofitted to all standard cross-shafts. When not in use, both embodiments can be folded and stored beneath the semi-trailer.

Accordingly, The instant invention provides an improved manual cranking apparatus for the landing gear of a semi-trailer, which apparatus allows a user to assume an erect posture when operating, thereby decreasing the incidence of back injury. The invention provides for improved elements and arrangements thereof for the purposes described which are inexpensive, dependable and fully effective in accomplishing their intended purposes and are generally compatible with all existing semi-trailer landing gear models.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
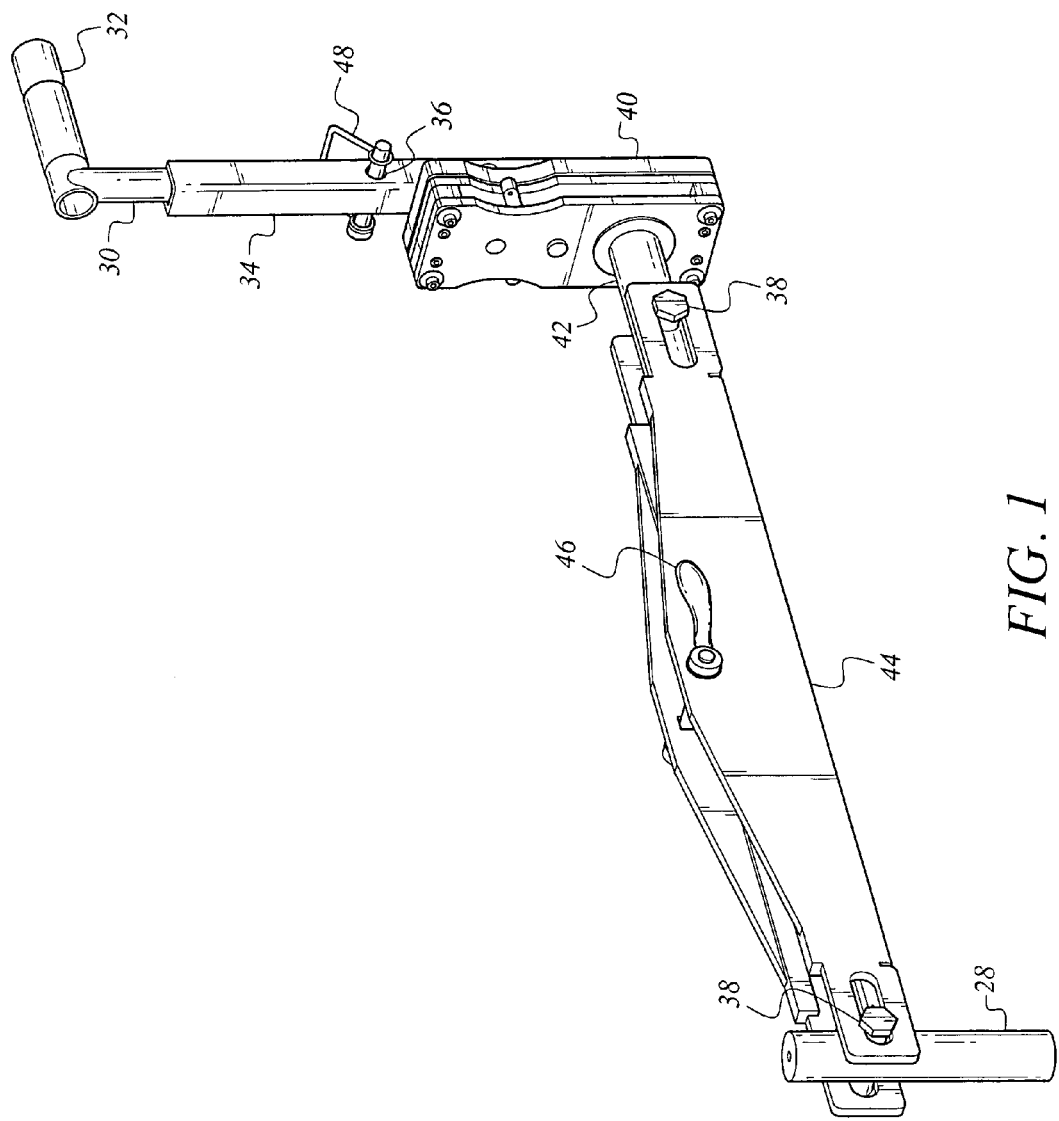
FIG. 1 is a perspective view of a first embodiment of an ergonomic landing gear raising and lowering apparatus in an extended in-use position according to the present invention.
Figure 2:
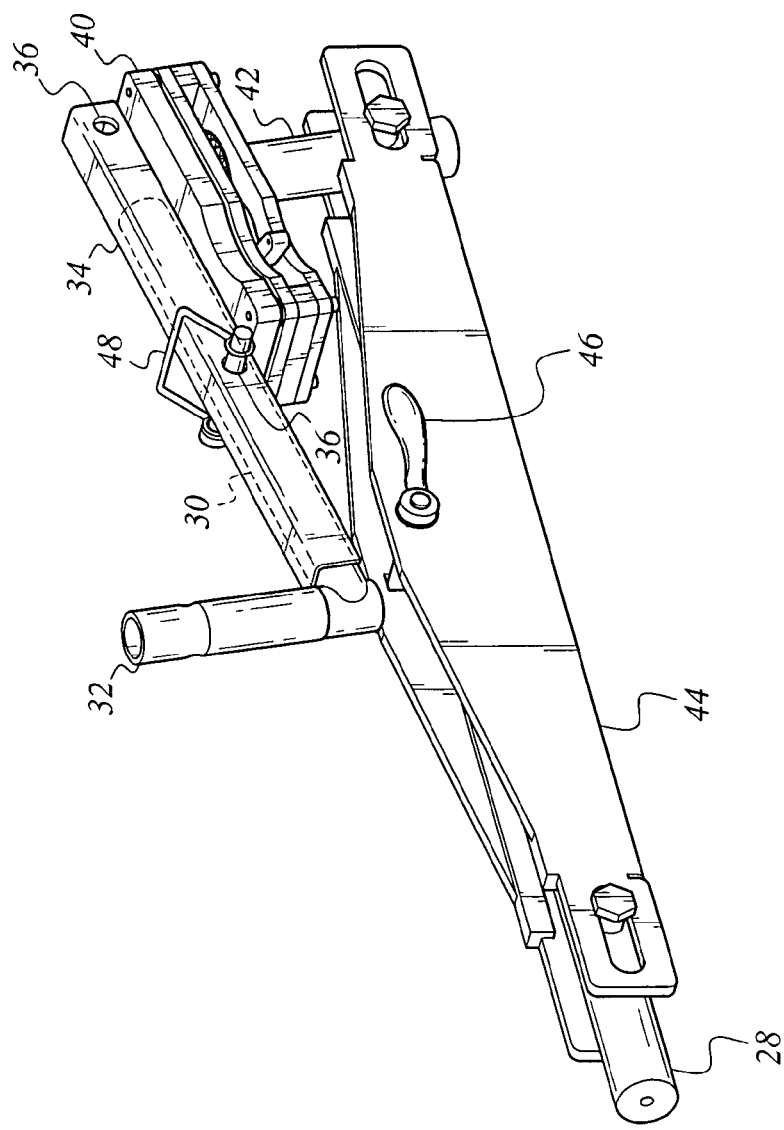
FIG. 2 is a perspective view of a first embodiment of an ergonomic landing gear raising and lowering apparatus in storage position according to the present invention.

Attention is first directed to FIGS. 1 and 2 wherein a first embodiment of the apparatus is illustrated. The first embodiment employs an arm 30 nested within a U-shaped channel 34 and extendable therein. A handle member 32 is disposed at one end of arm 30 and extends perpendicularly therefrom. Openings 36 (only one shown) are respectively provided along the length of the arm and the channel for purposes as will be explained below. A ratchet mechanism 40 is attached at its front face to the rear surface of the channel. A hub 42 extends from the rear face of the ratchet mechanism and is coupled to the cross-shaft 28 of the landing gear via a flanged coupling 44. A compression mechanism 46 may be employed to compress the flanges about the cross-shaft 28 if needed. A locking pin and bale assembly 48 is inserted through corresponding openings 36 to secure the arm in the channel in the desired extended position. Self-locking security bolts 38 are utilized to provide for secure pivoting and locking.

Figure 3:
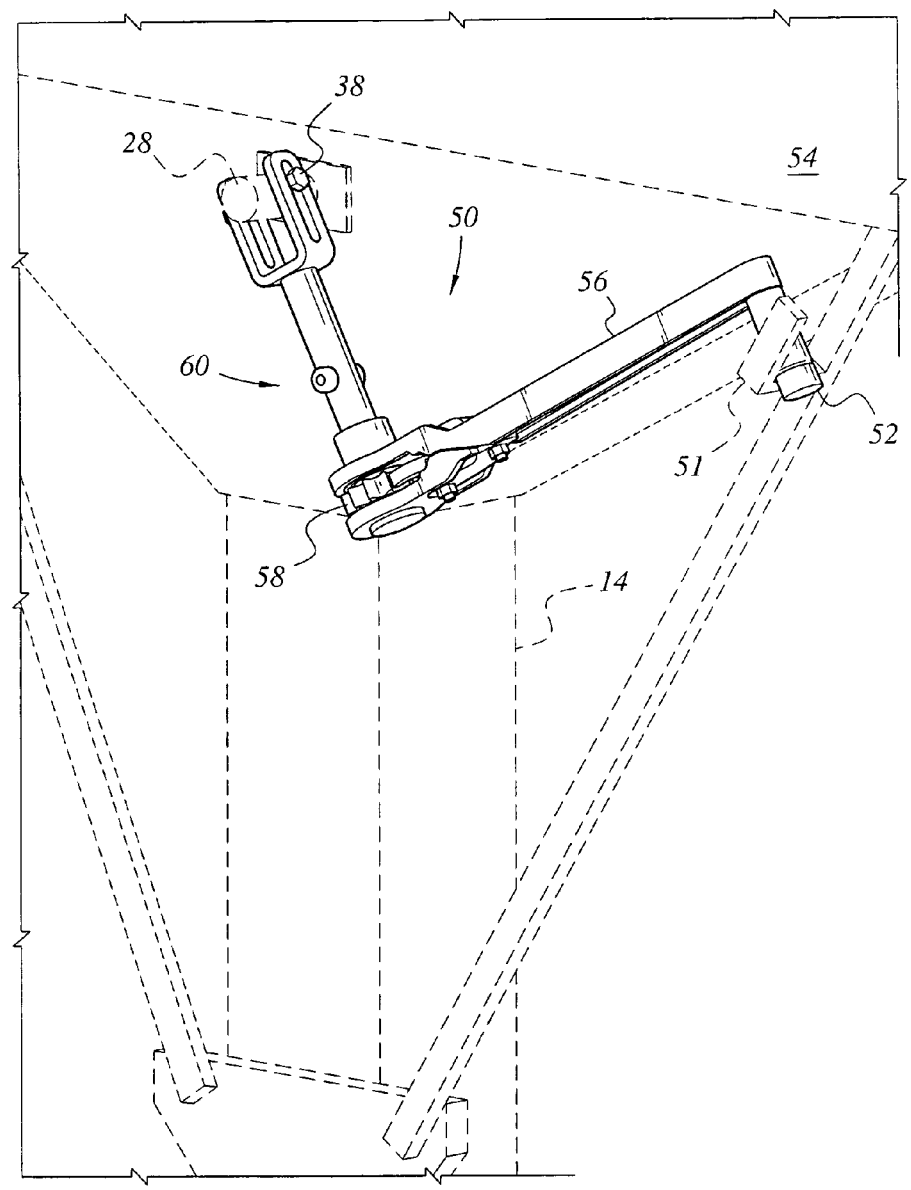
FIG. 3 is an environmental, perspective view of a second embodiment of an ergonomic landing gear raising and lowering apparatus in storage position according to the present invention.
Figure 4:
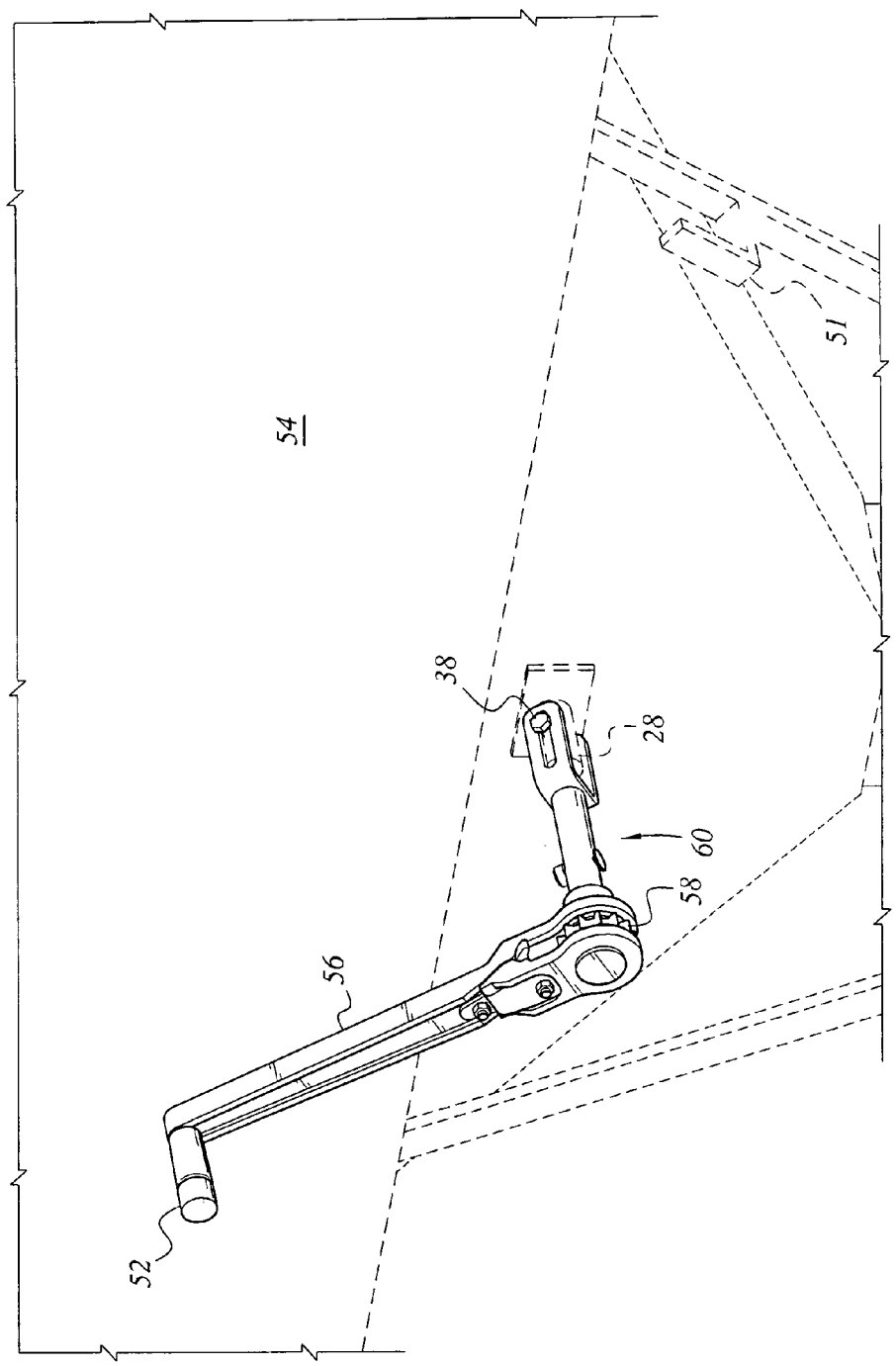
FIG. 4 is an environmental, perspective view of a second embodiment of an ergonomic landing gear raising and lowering apparatus in an in-use position according to the present invention.
Figure 5:
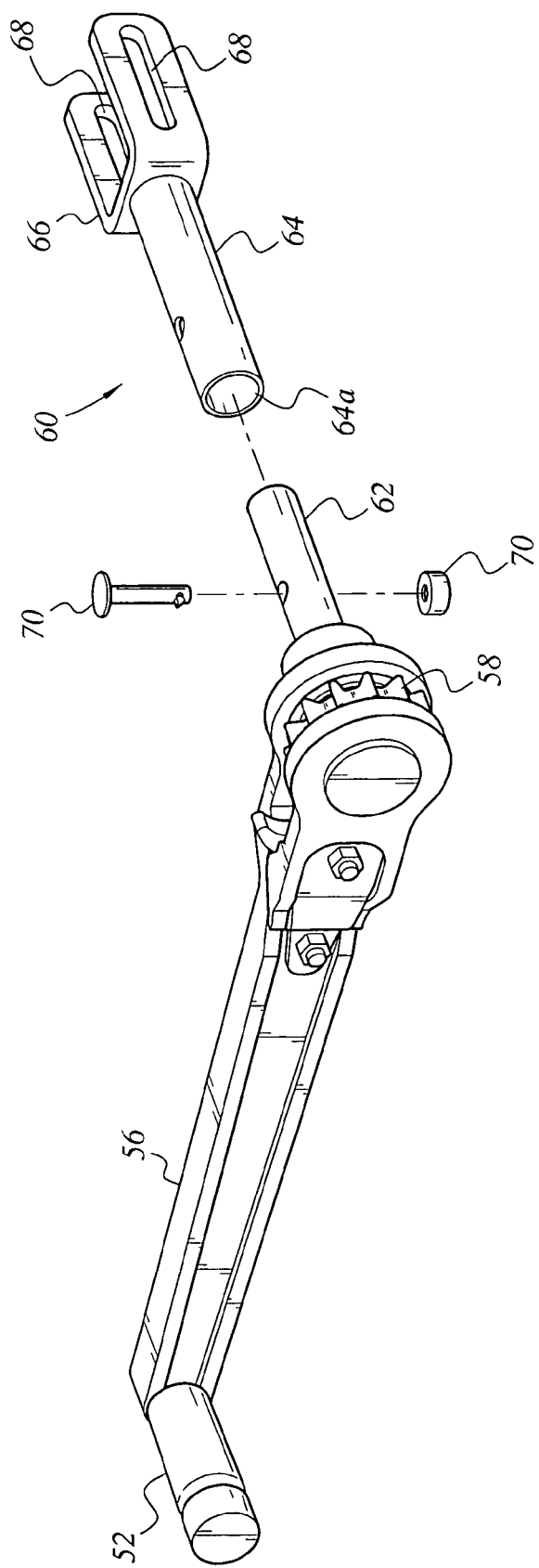
FIG. 5 is an exploded, perspective view of a second embodiment of an ergonomic landing gear raising and lowering apparatus according to the present invention.

A second embodiment of the present invention is illustrated in FIGS. 3–5. The raising and lowering apparatus of the second embodiment employs a more simplistic design than the first embodiment and is generally indicated at 50. In storage position, as best seen in FIG. 3, Apparatus 50 is folded in a manner that permits handle 52 to nest in a support member 51, which support member is attached to the undersurface of the semi-trailer 54. Handle 52 is attached by any suitable means (weld, bolt, etc.) to an end of arm 56. A ratchet mechanism 58 defines the other end of arm 56. A connector assembly 60 extends from the ratchet mechanism 58, which connector assembly is secured to cross-shaft 28 of the landing gear 14 by security locking bolt 38. When positioned for raising or lowering, the apparatus is unfolded to a position adjacent an exterior side of the semi-trailer 54 as illustrated in FIG. 4. As best seen in FIG. 5, connector assembly 60 includes a hub 62 secured to a face of ratchet mechanism 58. A tubular shaft 64 is fashioned with an open end 64a. Hub 62 is adapted to be removably received by open end 64a. The other end of shaft 64 terminates in a U-shaped connecting member 66 having a slotted opening 68 in each leg. Hub 62 and shaft 64 have openings therethrough for receiving a bolt and nut locking assembly 70. Shaft 64 will be fabricated in different lengths to accommodate all standard cross-shafts.

It is to be understood that the present invention is not limited to the embodiments described above, but encompasses any and all embodiments within the scope of the following claims.

I claim:

1. An apparatus for raising and lowering a landing gear of a semi-trailer by engagement with a cross-shaft of the landing gear, said apparatus comprising:
    an elongate arm member, said arm member having a first end and a second end;
    a handle fixed to and extending perpendicularly from said first end of said arm member;
    a ratchet mechanism fixed to the second end of said arm member;
    a tubular shaft having a first end and a second end, the first end of said tubular shaft being connected to said ratchet mechanism, said tubular shaft extending from said ratchet mechanism with said tubular shaft being perpendicular to said arm member; and
    a U-shaped member having a center portion and a pair of legs, said center portion of said U-shaped member connected to the second end of said tubular shaft; wherein
    when said legs of said U-shaped member are engaged with a landing gear cross-shaft of a semi-trailer, said apparatus permits a user to raise and lower the landing gear by use of a ratcheting motion, thereby allowing the user to assume an erect posture and economize the effort needed to raise and lower said landing gear.

2. The apparatus as recited in claim 1, wherein said leg members of said U-shaped member have slots therein.

3. In combination with a semi-trailer having an exterior side, an undersurface and landing gear, wherein said landing gear has a cross-shaft, an apparatus for raising and lowering said landing gear, said apparatus comprising:
    an elongate arm member, said arm member having a first end and a second end;
    a handle fixed to and extending perpendicularly from said first end of said arm member;
    a ratchet mechanism fixed to the second end of said arm member;
    a tubular shaft having a first end and a second end, the first end of said tubular shaft being connected to said ratchet mechanism, said tubular shaft extending from said ratchet mechanism with said tubular shaft being perpendicular to said arm member; and
    a U-shaped member having a center portion and a pair of legs extending therefrom, said center portion of said U-shaped member connected to the second end of said tubular shaft;
    said pair of legs of said U-shaped member being pivotally connected to said landing gear cross-shaft;
    wherein said apparatus permits a user to raise and lower the landing gear by use of a ratcheting motion, thereby allowing the user to assume an erect posture and economize the effort needed to raise and lower said landing gear.

4. The combination as recited in claim 3, wherein said leg members of said U-shaped member have slots therein.

* * * * *